(12) United States Patent
Vanfleteren et al.

(10) Patent No.: US 12,399,071 B2
(45) Date of Patent: Aug. 26, 2025

(54) COMPRESSIBLE ELECTRODE

(71) Applicants: IMEC VZW, Leuven (BE); Carpenter Engineered Foams Belgium, Machelen (BE); Universiteit Gent, Ghent (BE)

(72) Inventors: Jan Vanfleteren, Ledeberg (BE); Herbert De Pauw, Zwijnaarde (BE); Matthias Willockx, Wetteren (BE); Hugo De Winter, Wetteren (BE); Sofie Moorkens, Wetteren (BE)

(73) Assignees: IMEC VZW, Leuven (BE); UNIVERSITEIT GENT, Ghent (BE); CARPENTER ENGINEERED FOAMS BELGIUM, Machelen (BE)

( * ) Notice: Subject to any disclaimer, the term of this patent is extended or adjusted under 35 U.S.C. 154(b) by 296 days.

(21) Appl. No.: 17/997,898

(22) PCT Filed: May 26, 2021

(86) PCT No.: PCT/EP2021/063989
§ 371 (c)(1),
(2) Date: Nov. 3, 2022

(87) PCT Pub. No.: WO2021/239784
PCT Pub. Date: Dec. 2, 2021

(65) Prior Publication Data
US 2023/0175899 A1 Jun. 8, 2023

(30) Foreign Application Priority Data
May 29, 2020 (EP) ..................... 20177428

(51) Int. Cl.
*G01L 1/14* (2006.01)
*G01M 99/00* (2011.01)

(52) U.S. Cl.
CPC ........... *G01L 1/146* (2013.01); *G01M 99/001* (2013.01)

(58) Field of Classification Search
None
See application file for complete search history.

(56) References Cited

U.S. PATENT DOCUMENTS 9,752,940 B2 * 9/2017 Ogura .................. G01L 1/142
2007/0069418 A1 * 3/2007 Liao .................... B29C 43/18
264/238

(Continued)

FOREIGN PATENT DOCUMENTS

| CN | 108871629 A | 11/2018 |
|---|---|---|
| CN | 109115376 A | 1/2019 |
| JP | 2018155711 A | 10/2018 |

OTHER PUBLICATIONS

PCT International Search Report and Written Opinion, Application No. PCT/EP2021/063989, mailed Oct. 25, 2022; 15 pages.

(Continued)

*Primary Examiner* — John E Breene
*Assistant Examiner* — Nigel H Plumb
(74) *Attorney, Agent, or Firm* — McDonnell Boehnen Hulbert & Berghoff LLP

(57) ABSTRACT

The present invention provides a compressible electrode comprising a stably deformable polymer layer comprising a first outer surface, a second outer surface and at least one deformed portion formed as at least one indentation in the first outer surface and at least one corresponding protrusion in the second outer surface, and at least one non-deformed portion. The electrode further comprises at least one stretchable conductor layer arranged on or within the stably deformable polymer layer at the deformed portion and/or at the non-deformed portion. Further, the stably deformable polymer layer is stably deformed at the at least one deformed (Continued)

portion. The electrode further comprises an elastic material arranged on the first outer surface such that the elastic material fills the at least one indentation.

20 Claims, 9 Drawing Sheets

(56) References Cited

U.S. PATENT DOCUMENTS

2017/0075467 A1* 3/2017 Kim .................. G01L 1/148
2017/0362083 A1* 12/2017 Yee .................. B81B 7/0058
2019/0305139 A1* 10/2019 Baek ................. H01L 29/84

OTHER PUBLICATIONS

Gaoyang Pang, Jia Deng, Fangjinhua Wang, Junhui Zhang, Zhibo Pang, and Geng Yang; "Development of flexible robot skin for safe and natural human-robot collaboration." Micromachines 9, 576 (15 pages); published Nov. 5, 2018.

* cited by examiner

COMPRESSIBLE ELECTRODE

TECHNICAL FIELD

The present disclosure relates to the field of compressible electrodes.

More particularly, it relates to a compressible electrode and a capacitive pressure sensor comprising a compressible electrode.

BACKGROUND

A basic capacitive pressure sensor consists of two electrodes with a dielectric in between the electrodes. By applying force/pressure on the sensor, either the dielectric, and/or at least one of the electrodes are deformed, resulting in a measurable change of capacitance value of the sensor. For achieving a high sensitivity and high values of capacitance per unit area, compressible electrodes are usually used in the sensors.

A compressible electrode may consist of an electrically non-conductive, deformable polymer with electrically conductive fillers making the deformable polymer electrically conductive, resulting in an electrically conductive polymer composite. The compressible electrode may also, as an alternative, be a non-conductive polymer coated with a conductive layer. An example of a compressible electrode is disclosed in U.S. Pat. No. 9,752,940, in which the electrode has a single polymer layer with embedded conductive particles or a conductive layer arranged onto the single polymer layer.

However, there are several technical problems associated with existing solutions First of all, adding conductive fillers to produce an electrically conductive polymer composite may increase the hardness of the deformable polymer and thereby reduce the sensitivity of the whole compressible electrode. Secondly, when forming the compressible electrode as a conductive coating on a non-conductive polymer, there are generally requirements that need to be fulfilled but, in reality, may prove to be incompatible with each other. As an example, in order to have a sufficient sensitivity of the electrode, the non-conductive polymer used should be soft, e.g. a silicone rubber material or a gel, but problems often arise with adhesion capacity of the conductive coating to such soft polymers. Further, the adhesion process itself may need to be performed on non-flat surfaces that are not standard within the art.

Thus, there is a need in the art for improved compressible electrodes that may be used in capacitive pressure sensors.

SUMMARY

The disclosure describes aspects that at least partly overcome one or more limitations of the prior art. In particular, the disclosure describes a compressible electrode and a capacitive pressure sensor that are both sensitive and easy to transfer to a production environment.

As a first aspect of the disclosure, there is provided a compressible electrode comprising a stably deformable polymer layer comprising a first outer surface, a second outer surface, at least one deformed portion formed as at least one indentation in the first outer surface and at least one corresponding protrusion in the second outer surface, and at least one non-deformed portion.

The compressible electrode further comprises at least one stretchable conductor layer arranged on or within the stably deformable polymer layer at the at least one deformed portion and/or at the at least one non-deformed portion; and wherein the stably deformable polymer layer is stably deformed stably deformed at the at least one deformed portion.

The compressible electrode further comprises an elastic material arranged on the first outer surface such that the elastic material fills the at least one indentation of the at least one deformed portion.

The stably deformable polymer layer may be in the form of a sheet or layer and may form a substrate or a carrier for the stretchable conductor layer during e.g. deposition and printing of the stretchable conductor layer onto the stably deformable polymer layer. However, as an alternative, the stretchable conductor layer may be arranged within the stably deformable polymer layer, i.e. be embedded in the stably deformable polymer layer.

The stably deformable polymer layer may be any polymer layer that may be deformed into a stable, deformed shape. The stably deformable polymer layer will retain the stable, deformed shape in the absence of any external force on the stably deformable polymer layer.

A deformation of the stably deformable polymer layer may be achieved by subjecting the stably deformable polymer layer to external conditions causing the deformation. For instance, the deformation may be caused by one or more of heating, applying a pressure or a vacuum on the stably deformable polymer layer.

The deformation may be achieved by a thermoforming process, which may include heating, shaping and cooling of the stably deformable polymer layer, for bringing the stably deformable polymer layer into a deformed shape, which may or may not be a predetermined shape of the stably deformable polymer layer. Thus, the stably deformable polymer layer may be a thermoformable polymer layer, such as formed by a thermoset material or a thermoplastic material.

According to an embodiment, the stably deformable polymer layer may be configured to be irreversibly deformed into a deformed shape. For instance, the stably deformable polymer layer may be formed by a thermoset material, which may be irreversibly deformed into a deformed shape by curing, such as heating.

According to another embodiment, the stably deformable polymer layer may be configured to be reversibly deformed, such that the stably deformable polymer layer may be deformed and, upon being subjected to a sufficient external force, the stably deformable polymer layer may be re-shaped. For instance, the stably deformable polymer layer may be formed by a thermoplastic material, which may be deformed into a deformed shape by e.g., a thermoforming process and which may be re-shaped by again heating the thermoplastic material above its melting temperature, reshaping it, followed by cooling it down below its melting temperature. The stably deformable polymer layer may alternatively be formed by a shape memory polymer, which may be deformed from a primary shape into a secondary predetermined deformed shape by heating it above its glass transition temperature and deforming it into the secondary predetermined deformed shape, followed by cooling it down below its glass transition temperature, and may be further returned into its primary shape, e.g., by heating the shape memory polymer above its glass transition temperature.

The stably deformable polymer layer may comprise a thermoplastic polymer, or may consist of a thermoplastic polymer, which becomes mouldable at a certain elevated temperature and then solidifies upon cooling. Thus, the thermoplastic polymer allows for being moulded in a wide range of shapes, then be resoftened and be moulded again, as explained above.

The stably deformable polymer layer comprises a first outer surface and a second outer surface. At least the second outer surface may function as an outer surface of the compressible electrode.

The stably deformable polymer layer further comprises at least one deformed portion, which refers to a structure of the stably deformable polymer layer that has been deformed during the manufacturing process. Further, the at least one deformed portion has a shape or structure such that it may be macroscopically deformed or compressed upon a force acting against the normal of the first or second outer surface of the stably deformable polymer layer. Accordingly, a deformed portion may be arranged to be compressed upon a compression force applied parallel to the normal of the first outer surface.

The deformed portion may be in the form of a "micro bump" defined by an indentation in one of the outer surfaces and a corresponding protrusion in the other. The stably deformable polymer layer may thus be a flat surface having one or several of such deformed portions, such as one or several micro bumps in the flat surface. Consequently, the stably deformable polymer layer comprises at least one deformed portion and at least one non-deformed portion. Such non-deformed portions may be flat or substantially flat portions between deformed portions. A non-deformed portion refers to a portion that has not been stably deformed during the manufacturing process and may thus retain its non-deformed shape, such as retaining a flat shape. The non-deformed portion may macroscopically be compressed to a lesser degree compared to a deformed portion. Consequently, the deformed portions and the non-deformed portions may comprise the same stably deformable polymer layer, but the deformed portion may be macroscopically compressed to a larger extent as a response to a compression force. There is further at least one stretchable conductor layer, which is an electrically conductive layer, arranged at the deformed portion or portions and/or at the non-deformed portion or portions of the stably deformable polymer layer. Thus, the at least one stretchable conductor layer may be arranged on an outer surface of the stably deformable polymer layer. As an alternative, the stretchable conductor layer may be arranged within the stably deformable polymer layer at the deformed portion and/or at the non-deformed portion, such as within the indentation or on the protrusion of the deformed portion. The stretchable conductor layer may further extend such that it is arranged at several deformed portions and non-deformed portions.

According to an embodiment, the at least one stretchable conductor layer may be arranged on or within the stably deformable polymer layer at least at the at least one deformed portion. This implies that the at least one stretchable conductor layer is deformed with the stably deformable polymer layer at the at least one deformed portion. According to an embodiment, the at least one stretchable conductor layer is arranged only at the at least one deformed portion. However, according to another embodiment, the at least one stretchable conductor layer is arranged to extend both at the at least one deformed portion and at the non-deformed portion.

According to yet another embodiment, the at least one stretchable conductor layer is arranged only at the at least one non-deformed portion. This implies that the at least one stretchable conductor layer will not be deformed with the stably deformable polymer layer at the at least one deformed portion.

The stretchable conductor layer may be a single layer that is patterned as multiple parallel running strips. The pattern may be applied by printing of the conductor through a patterned mask. The conductor, and thus the conductor layer, may comprise conductive fillers in a (stretchable) binder resin.

At the deformed portion, the stably deformable polymer layer is stably deformed, meaning that the stably deformable polymer layer has been loaded beyond its elastic limits, e.g. in a thermoforming process, such that it does not return to its original shape and size in the absence of external forces and/or heating. If the at least one stretchable conductor layer is arranged at the at least one deformed portion, the at least one stretchable conductor layer is also stably deformed at the deformed portion. The at least one stretchable conductor layer may also be loaded beyond its elastic limits, e.g. in a thermoforming process, such that it does not return to its original shape and size in the absence of external forces and/or heating.

The deformed portion may have a rounded shape. As an example, the protrusion of deformed portion may have a rounded shape, such as substantially a half-spherical shape. However, other shapes are also possible, such as a shape in which the protrusion forms a tip as seen in a cross-section of the deformed portion. According to other embodiments, the protrusion may be configured to be tapered with a gradually decreasing width. For instance, the protrusion may have a truncated pyramidal overall shape, such as a circular truncated conical shape or a four-sided truncated pyramidal shape.

There is further an elastic material arranged or deposited within the indentation of the deformed portion. The elastic material may be a hyperelastic material. As an example, the elastic material may be a soft elastic material, such as a material having a Young's modulus in the range 0 to 500 MPa, such as a Young's modulus in the range of 0 to 100 MPa or a Young's modulus in the range of 0 to 25 MPa. The elastic material may have an elastic hysteresis in the range of 0-40%, such as a range smaller than 20%. The elastic material may have a shore OO hardness in the range of 0-90, such as in the range of 20-40.

The elastic material may be deposited solely within the indentation or as a layer covering also the non-deformed portions of the first outer surface of the stably deformable polymer layer. Thus, the elastic material may be deposited as a layer over the first outer surface of the stably deformable polymer layer so that the elastic material fills the indentations.

The elastic material may have a thickness that is several times larger than the thickness of the stably deformable polymer layer.

The first aspect is based on the insight that having a compressible electrode comprising two different materials, e.g., both a stably deformable polymer layer and an elastic material, instead of a single polymer layer as in the prior art. The stably deformable polymer layer forms a convenient substrate for the stretchable conductor layer or sheet, allowing deposition by e.g., printing of the conductor with good adhesion of the electrically conductive material to the stably deformable polymer layer. The deposition may be performed on a flat stably deformable polymer layer, e.g., on a flat substrate, which allows to apply a mass-production friendly technique. The shape of the deformed portion (indentation and protrusion) may then subsequently be obtained e.g. by thermoforming the flat stably deformable polymer layer, together with the deposited stretchable conductor layer if the stretchable conductor layer is arranged at the deformed portion, to a non-flat shape, thereby forming at least one deformed portion.

The elastic material may be arranged on the electrode so that the mechanical stability and behavior of the complete electrode is primarily determined by this elastic material. Thus, the elastic material may be arranged so that the complete electrode behaves in mainly an elastic manner; i.e., returns perfectly without any plastic deformation to its initial state after applying and releasing a force to the electrode, even repeatedly. Thus, the first aspect provides a compressible electrode having low drift or creep over time. Since the stretchable conductor layer is arranged on the stably deformable polymer layer, the type of elastic material may be chosen more freely compared to conventional compressible electrodes. As an example, the softness of the elastic material may be chosen more freely, e.g., from soft gel materials, so that high deformation under low force, and thus high sensitivity, may be obtained.

In embodiments of the first aspect, the at least one stretchable conductor layer comprises stretchable silver ink. The stretchable conductor layer may also consist of intrinsically stretchable conductive polymers like such as PEDOT, thin-film or PCB (Printed Circuit Board) type metal conductors, such as Cu or Au. Further, the stretchable conductor layer may be patterned as meanders, spirals, etc., which deform, e.g. elongate or compress under an applied force.

In embodiments of the first aspect, the at least one stretchable conductor layer is arranged on the first outer surface of the stably deformable polymer layer. Consequently, the compressible electrode may have the stretchable conductor layer or stretchable conductor layers embedded between the thermoplastic polymer layer and the elastic material.

As an alternative, the stretchable conductor layer may be exposed. Thus, in embodiments of the first aspect, the at least one stretchable conductor layer is arranged on the second outer surface of the stably deformable polymer layer.

In embodiments of the first aspect, the at least one stretchable conductor layer comprises a plurality of strips of electrically conductive material.

The strips may be arranged such that one strip covers more than one deformed portion. The strips may have a width of e.g. 5-20 mm, such as between 6-15 mm, such as between 6-10 mm. The strips may be arranged at a pitch of 5-20 mm, such as about 10 mm.

In embodiments of the first aspect, the at least one stretchable conductor layer is arranged at the at least one deformed portion such that it further extends on the at least one non-deformed portion of the first and/or second outer surface.

In embodiments, the stably deformable polymer layer may be a flat layer having at least one deformed portion, and the stretchable conductor layer may be arranged so that it also extends from the at least one deformed portion onto a flat portion of the first or second outer surface of the stably deformable polymer layer. Thus, in embodiments, the stretchable conductor layer is also arranged at a non-deformed, flat portion of the compressible electrode.

As an example, a stretchable conductor layer may be arranged such that it covers more than one deformed portion, such as at least two, such as at least three deformed portions.

Accordingly, in embodiments, the stably deformable polymer layer comprises a plurality of deformed portions, and wherein at least one stretchable conductor layer is arranged on or within the stably deformable polymer layer at the plurality of deformed portions.

Thus, a single stretchable conductor layer or strip may be arranged such that it covers several deformed portions of the stably deformable polymer layer.

In embodiments of the first aspect, the elastic material has a volume that is larger than the volume of the stably deformable polymer layer. As an example, the elastic material may have a volume that is at least two times, such as at least five times, or at least ten times or even at least twenty times larger than the volume of the stably deformable polymer layer.

The volumes of the elastic material and the stably deformable polymer layer may be related such that the mechanical properties of the compressible electrode are primarily determined by the mechanical properties of the elastic material.

The functional behavior, such as hysteresis and hardness, of the electrode may be determined by material properties of the elastic material. Thus, the elastic material may be a dominant influence on the functional behavior of the electrode. For instance, the hardness and/or the hysteresis of the electrode may be comparable or in the same range as of the elastic material.

The elastic material may be a polymer. As an example, the elastic material may be a thermoplastic elastomer. A thermoplastic elastomer may be selected from the group consisting of thermoplastic urethanes (TPUs), styrene copolymers (e.g., styrene block copolymer, such as styrene-ethylene-butylene-styrene block copolymer (SEBS) and/or styrene-butylene-styrene block copolymer (SBS)), thermoplastic olefins (TPOs), thermoplastic silicones or elastomeric alloys. The elastic material can comprise at least one thermoplastic gel material, such as a polyurethane gel, thermoplastic block copolymer gels (SEBS), PVC plastisol gels, and silicone rubbers such as PDMS (poly dimethyl siloxane).

Moreover, the stably deformable polymer layer may comprise or consist of polyethylene, polypropylene, polyvinyl chloride, polystyrene, polyamides, polyesters or polyurethanes. As an example, the stably deformable polymer layer may be a thermoplastic polyurethane. The stably deformable polymer layer may be a shape memory polymer, such as a block polymer of polyethylene terephthalate and polyethyleneoxide.

The first outer surface and the second outer surface of the stably deformable polymer layer need not necessarily be formed by the same material. For instance, the first outer surface may be a high recovery TPU and the second outer surface may be a melt adhesive TPU.

In embodiments of the first aspect, the stably deformable polymer layer is thermoplastic polyurethane and the elastic material is a polyurethane gel.

In embodiments of the first aspect, the thickness of the stably deformable polymer layer is less than 100 μm, such as less than 55 μm. As an example, the thickness of the stably deformable polymer layer may be between 10-100 μm, such as between 20-60 μm, such as between 25-50 μm.

According to a second aspect of the disclosure, a method of forming a compressible electrode is provided. The method includes arranging at least one stretchable conductor layer on a first or second outer surface of a stably deformable polymer layer; forming at least one deformed portion as at least one indentation in the first outer surface and at least one corresponding protrusion in the second outer surface of the stably deformable polymer layer, thereby stably deforming the stably deformable polymer layer; and filling the at least one indentation with an elastic material.

This aspect may generally present the same or corresponding advantages as the former aspect. Effects and features of this second aspect are largely analogous to those described above in connection with the first aspect. Embodiments mentioned in relation to the first aspect are largely compatible with the second aspect.

As an alternative, the method may comprise arranging the at least one stretchable conductor layer within a stably deformable polymer layer.

The method of the second aspect may thus be used to form or produce a compressible electrode according to the first aspect as discussed herein above.

In embodiments of the second aspect, arranging the at least one stretchable conductor layer comprises printing at least one strip of a stretchable conductor layer onto the first or second surface of the stably deformable polymer layer.

In embodiments of the second aspect, the at least one deformed portion is formed at the position of the at least one stretchable conductor layer, thereby stably deforming the stably deformable polymer layer and the at least one stretchable conductor layer.

In embodiments of the second aspect, forming at least one deformed portion comprises subjecting the stably deformable polymer layer to a thermoforming process. If the at least one deformed portion is formed at the position of the at least one stretchable conductor layer, the at least one stretchable conductor layer is also subjected to a thermoforming process.

Thermoforming is a process where a temperature and/or a force is applied, e.g., by a temperature and force being applied at the same time or sequentially so that the to-deform-structure becomes soft enough so that it can be deformed according to the shape of e.g., a forming tool. The force may be provided by applying a pressure, such as used in compression molding. The force may also be generated by a vacuum. When the increased temperature and/or force is removed, the structure has completely or at least partially taken the form of the forming tool.

Thus, the forming may comprise raising the temperature of the stably deformable polymer layer and the at least one stretchable conductor layer such that they are pliable and extensible, and thus deformable, and then forming them in a mold to create the desired deformed portion.

Thermoforming may comprise "vacuum forming", in which vacuum is applied only at the backside of the (porous) forming tool and "high pressure forming", in which additional high (air) pressure is applied at the front side of the forming tool.

As an example, the thermoforming process may be performed by heating the stably deformable polymer layer, thereby forming the at least one deformed portion using a forming tool having at least one indentation corresponding to the shape of the at least one deformed portion. The forming tool thus functions as a mold for creating the deformed portion or portions in the stably deformable polymer layer. A forming tool is normally a polymer or a metal object with a surface having a shape equal to the desired final shape of the surface the thermoformed object. Moreover, the forming tool may have through holes from frontside to the backside, or is porous, so that vacuum may pull the thermoformed object to the walls of the forming tool.

In embodiments of the second aspect, the elastic material is further formed at non-deformed portions of the first outer surface of the stably deformable polymer layer. Thus, both the indentations and the non-deformed portions of the stably deformable polymer layer may be filled with the elastic material, e.g. using a deposition process.

In embodiments of the second aspect, filling with the elastic material is performed while the stably deformable polymer layer and the at least one stretchable conductor layer is still in a forming tool used during a thermoforming process for forming the deformed portions. However, as an alternative, the stably deformable polymer layer and the at least one stretchable conductor layer may be removed from such a forming tool and e.g. transferred to another structured carrier before filling with the elastic material.

As a third aspect of the disclosure, there is provided a capacitive pressure sensor comprising a compressible electrode according to the first aspect arranged over an additional electrode and with the second outer surface facing the additional electrode; and at least one dielectric medium arranged between the second outer surface and the additional electrode. The compressible electrode and additional electrode are arranged such that compression of the at least one deformed portion of the compressible electrode changes the capacitance of the capacitive pressure sensor.

This aspect may generally present the same or corresponding advantages as the former aspect. Effects and features of this third aspect are largely analogous to those described above in connection with the first and second aspects. Embodiments mentioned in relation to the first and second aspects are largely compatible with the third aspect.

The compressible electrode may thus form one electrode of the capacitive pressure sensor. The additional electrode can be a flat electrode or a compressible electrode.

The at least one dielectric medium may comprise air. By applying a pressure in the direction of the normal of the first surface of the stably deformable polymer layer, the amount of the at least one dielectric medium, such as air, may decrease due to the compression of the deformed portion of the compressible electrode. Thus, the distance between the two electrodes, i.e. the distance between the two capacitor plates decreases and the capacitance value of the pressure sensor will increase. This change in capacitance may be measured and thus correspond to the pressure applied.

In embodiments of the third aspect, the at least one deformed portion of the compressible electrode abuts the additional electrode, or an additional dielectric layer arranged on top of the additional electrode.

Thus, the protrusion of the deformed portion may be arranged such that it abuts the additional electrode. As an alternative, there may be an additional dielectric layer arranged over the additional electrode, and the protrusion may abut this additional dielectric layer.

In embodiments of the third aspect, the at least one stretchable conductor layer is arranged on the first outer surface of the stably deformable polymer layer of the compressible electrode, and wherein the at least one dielectric medium is air. Thus, the compressible electrode may have the stretchable conductor layers "embedded" between the stably deformable polymer layer and the elastic material, such that the second surface of the stably deformable polymer layer at the deformed portion abuts the additional electrode. In such case, the at least one dielectric medium may comprise air or may only consist of air.

In further embodiments of the third aspect, the stretchable conductor layer is arranged within the stably deformable polymer layer. In such case, the at least one dielectric may also comprise air or consist only of air, i.e. there may be no additional dielectric layer arranged on the additional electrode.

As an alternative embodiment of the third aspect, the at least one stretchable conductor layer is arranged on the second outer surface of the stably deformable polymer layer of the compressible electrode, and further wherein the sensor comprises an additional dielectric layer arranged on top of the additional electrode, such that the at least one dielectric comprises both air and the additional dielectric layer. Consequently, when the stretchable conductor layers are arranged such they are exposed, i.e. on the second outer surface of the stably deformable polymer layer, there may be an additional dielectric layer arranged over the additional electrode to avoid a short circuit between the compressible electrode and the additional electrode. Thus, in such cases, the at least one dielectric medium may comprise air and the additional dielectric layer arranged on the additional electrode.

The additional dielectric layer may be formed e.g. by spin coating or lamination. The thickness of this additional dielectric layer may be less than 10 μm, such as between 1-5 μm.

According to an embodiment, the capacitive pressure sensor is configured to be integrated into an arrangement for receiving and supporting at least a part of a body of a person.

The arrangement for receiving and supporting at least a part of a body of a person may be any item associated with a sit or sleep arrangement, such as a piece of furniture or seat or an accessory used therewith. Thus, the arrangement for receiving and supporting at least a part of a body of a person may be a piece of furniture, such as a chair, such as an office chair, a sofa, a bed base, a slatbase, a boxspring, a mesh base bed frame, or a winged bed frame. The arrangement for receiving at least a part of a body of a person may be a seat, such as a vehicle seat, or a saddle, e.g. a saddle of a bicycle or a motorcycle. Thus, the arrangement for receiving and supporting at least a part of a body of a person may be an accessory to a piece of furniture or a seat, such as a pillow, mattress topper, a mattress, or a cover for a pillow, a mattress or a seating.

The arrangement may be configured such that a person will lie or sit in the arrangement, such that more or less the entire body of the person may be received by the arrangement and supported by the arrangement. However, the arrangement may be configured to support a part of the body of the person, such as a head of the person that rests on a pillow.

As a fourth aspect of the disclosure, there is provided an arrangement for receiving and supporting at least a body of a person. The arrangement comprises at least one capacitive pressure sensor integrated therein.

This aspect may generally present the same or corresponding advantages as the former aspects. Effects and features of this fourth aspect are largely analogous to those described above in connection with the first, second, and third aspects. Embodiments mentioned in relation to the first, second, and third aspects are largely compatible with the fourth aspect.

Thanks to the arrangement with an integrated capacitive pressure sensor, an opportunity of bringing measurement technology into commercial sit and/or sleeping products is opened up. This may allow analysis based on sensed information in the sit and/or sleeping product for providing analysis such that feedback to the person e.g. on sleep or sit posture may be provided and/or information on durability of the sit and/or sleeping product may be provided. Also, or alternatively, the sit and/or sleeping product may be controlled based on the sensed information so as e.g. to adapt to a change of posture of the person.

The arrangement may comprise one capacitive pressure sensor. However, for improved gathering of information, a plurality of capacitive pressure sensors may be integrated therein. The plurality of capacitive pressure sensors may be individually integrated or may be integrated in the arrangement in an array.

As a fifth aspect of the disclosure, there is provided an array of capacitive pressure sensors. The array comprises a plurality of capacitive pressure sensors according to the third aspect. The plurality of capacitive pressure sensors are formed by a plurality of separate first strips. Each first strip comprising the compressible electrode of a subset of the plurality of capacitive pressure sensors and being configured to extend in a first direction. Each strip comprises a plurality of deformed portions. The array also comprises a plurality of separate second strips. Each second strip comprising the additional electrode of a subset of the plurality of capacitive pressure sensors and being configured to extend in a second direction, which is not parallel to the first direction. The plurality of first strips and the plurality of second strips are arranged so as to form crossings between the first strips and the second strips. The first and the second strips overlap. Each crossing defines one of the plurality of capacitive pressure sensors in the array.

This aspect may generally present the same or corresponding advantages as the former aspects. Effects and features of this fifth aspect are largely analogous to those described above in connection with the first, second, third, and fourth aspects. Embodiments mentioned in relation to the first, second, third, and fourth aspects are largely compatible with the fifth aspect.

Thus, the compressible electrodes may extend in a first direction and the additional electrodes may extend in a second, different direction for defining crossings between the compressible electrodes and the additional electrodes, wherein capacitive pressure sensors are formed in the array.

The plurality of first strips may be parallel. Also, the plurality of second strips may be parallel. Further, the first and second directions may be perpendicular to each other. This implies that a regular pattern of crossings between the first and second strips may be formed for defining a regular arrangement of the plurality of capacitive pressure sensors in the array.

However, it should be realized that the first and second strips may be arranged in other manners. Thus, the plurality of first strips need not be parallel and the plurality of second strips need not be parallel. For instance, a distance between adjacent strips may increase from one end of the strips to the other end of the strips. This could be used e.g. if different distances between adjacent capacitive pressure sensors are needed in different parts of the array for providing pressure sensing with different spatial resolution in different parts of the array. Also, it should be realized that the strips need not necessarily extend along a straight path. Rather, the strips may for example define curved paths.

Further, it should be realized that the first strips need not extend only along the first direction. Rather, if the first strips are not parallel or if the first strips do not follow a straight path, all of the first strips will not extend only along the first direction. However, the first direction is such that the extension of each of the first strips will have a component extending along the first direction.

Similarly, it should be realized that the second strips need not extend only along the second direction. Rather, if the second strips are not parallel or if the second strips do not follow a straight path, all of the second strips will not extend only along the second direction. However, the second direction is such that the extension of each of the second strips will have a component extending along the second direction.

If the first direction and the second direction are defined as perpendicular, the first strips may have a larger component along the first direction than along the second direction, whereas the second strips may have a larger component along the second direction than along the first direction.

It should further be realized that the first and second directions may be defined as extending in a plane of a layer forming the capacitive pressure sensors. For instance, the first and second directions may be defined as extending in the plane of a layer in which the additional electrodes are formed. The first strips may then be viewed as having a projection onto the layer in which the additional electrodes are formed and the projection having an extension along the first direction in the layer.

The plurality of first strips being separate may imply that the plurality of first strips are electrically insulated from each other. The plurality of first strips may be separate by not making contact with each other within the array of capacitive pressure sensors. Similarly, the plurality of second strips being separate may imply that the plurality of second strips are electrically insulated from each other. The plurality of second strips may be separate by not making contact with each other within the array of capacitive pressure sensors.

It should be realized that the stably deformable polymer layer may extend over an entire area of the array of capacitive pressure sensors. The stably deformable polymer layer is provided with a plurality of deformed portions, such that at least one deformed portion is associated with each crossing between the first strips and the second strips. Thus, at least one deformed portion is associated with each capacitive pressure sensor.

The deformed portions in the stably deformable polymer layer may be formed at regular intervals, such that there may be deformed portions between the crossings as well.

The elastic material may also extend over an entire area of the array of the capacitive pressure sensor.

The at least one stretchable conductor layer may be configured to extend along the first strip, such that separate portions of the at least one stretchable conductor layer extend along the separate first strips. Thus, the first strips may be defined by the portions of the at least one stretchable conductor layer. However, it should be realized that the stably deformable polymer layer and/or the elastic layer may also be arranged having separate portions extending along each of the separate strips.

It should be realized that the subsets of the plurality of capacitive pressure sensors defined by the first strips are different from the subsets of the plurality of capacitive pressure sensors defined by the second strips. For instance, if the array of capacitive pressure sensors define rows and columns, each of the subsets defined by the first strips may correspond to the capacitive pressure sensors in a row of the array, whereas each of the subsets defined by the second strips may correspond to the capacitive pressure sensors in a column of the array.

As mentioned above in relation to the compressible electrode, the softness of the elastic material may be chosen so that high deformation under low force, and thus high sensitivity, may be obtained. Thus, the use of the compressible electrodes in an array of capacitive pressure sensors may for instance allow pressure sensing over an area with high sensitivity.

As a sixth aspect of the disclosure, there is provided a sit or sleep arrangement, comprising: at least one capacitive pressure sensor according to the third aspect, and an output device, which is configured to be controlled based at least on an input from the at least one capacitive pressure sensor for controlling at least one property of the sit or sleep arrangement in a group of properties comprising: a hardness of one or more zones of the sit or sleep arrangement, a shape of the sit or sleep arrangement, a temperature of the sit or sleep arrangement, and air circulation of the sit or sleep arrangement.

This aspect may generally present the same or corresponding advantages as the former aspects. Effects and features of this sixth aspect are largely analogous to those described above in connection with the first, second, third, fourth, and fifth aspects. Embodiments mentioned in relation to the first, second, third, fourth, and fifth aspects are largely compatible with the sixth aspect.

Thus, the output from at least one capacitive pressure sensor may be used as an input for controlling an output device in a sit or sleep arrangement. An output by the output device may thus be adapted to a received input from the at least one capacitive pressure sensor. The output device may control a property of the sit or sleep arrangement, such that the sit or sleep arrangement may be dynamically controlled in dependence of the pressure sensed by the capacitive pressure sensor. This may e.g. be used for adapting the sit or sleep arrangement to change of posture of a person using the sit or sleep arrangement.

BRIEF DESCRIPTION OF THE DRAWINGS

The above, as well as additional aspects of the present disclosure, will be better understood through the following illustrative and non-limiting detailed description, with reference to the appended drawings. In the drawings like reference numerals will be used for like elements unless stated otherwise.

DETAILED DESCRIPTION

Figure 1:
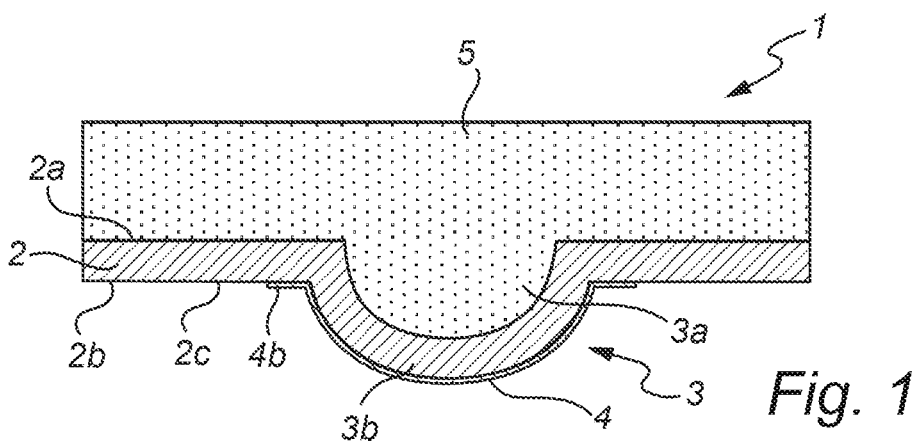
FIG. 1 is a schematic illustration of a cross-section of an embodiment of a compressible electrode with an exposed conductor layer.

FIG. 1 is a schematic illustration of a cross-section of an embodiment of a compressible electrode 1 with an exposed conductor layer. The compressible electrode 1 comprises a thin stably deformable polymer layer 2, arranged as a sheet having micro-bumps, or deformed portions 3. The thickness of the stably deformable polymer layer 2 may be less than 100 µm, such as less than 55 µm, such as 25-50 µm.

There is only one deformed portion 3 illustrated in FIG. 1, but the stably deformable polymer layer 2 may comprise a plurality of such deformed portions 3, such as at least five, such as at least ten, deformed portions. A deformed portion 3 is formed as an indentation 3a in a first outer surface 2a— in this case the upper outer surface—and a corresponding protrusion 3b in a second outer surface 2b— in this case the lower outer surface—of the stably deformable polymer layer.

There is further a stretchable conductor layer 4 arranged on the second outer surface 2b of the stably deformable polymer layer 2, which thereby results in a compressible electrode having an exposed conductor layer 4. The stretchable conductor layer 4 comprises an electrically conductive material. As an example, it may comprise or consist of stretchable silver ink. This stretchable conductor layer 4 is arranged at the position of the deformed portion 3. Moreover, the stably deformable polymer layer 2 and the stretchable conductor layer 4 are stably deformed at the at least one deformed portion 3. The stretchable conductor layer is in this example in the form of several parallel strips, but it should be realized that other forms, shapes or configurations of the stretchable conductor layer are possible. Only one strip of conductor material is illustrated in FIG. 1. This strip may however extend such that it is arranged over at least two deformed portions. Thus, the stretchable conductor layer 4 is arranged at the deformed portion 3 such that it further extends with edge portions 4b on a flat portion 2c of the second outer surface 2b. The flat portion 2c is thus positioned next to the deformed portion 3, i.e. in between two deformed portions 3, and may thus function as a substantially non-deformed portion of the electrode 1. This means that a pressure applied in the direction of the normal of the first 2a or second 2b outer surface of the stably deformable polymer layer will mainly result in deformation or compression of the deformed portion 3 and not the flat surface portion 2c.

The thin stably deformable polymer layer may be of thermoplastic polyurethane, thus forms a substrate for the stretchable conductor layer 4. This allows for printing or deposition of the stretchable conductor layer 4 before forming the deformed portions 3, i.e. deposition of the stretchable conductor layer 4 on a flat surface, which is a mass-production friendly technique. The shape of the deformed portion or portions may subsequently be obtained by thermoforming the flat stably deformable polymer layer 2 and deposited conductor material to a non-flat shape (e.g., a matrix of spherical structures).

The compressible electrode 1 further comprises an elastic material 5 arranged on the outer surface 2a of the stably deformable polymer layer 2 at least such that it fills at least one indentation 3a. As illustrated in FIG. 1, the elastic material 5 may also be deposited on the flat portions 2c of the stably deformable polymer layer 2. In this case, the elastic material has been deposited on the flat surface 2c of the stably deformable polymer layer 2 such that it also fills the indentations 3a.

Since the stably deformable polymer layer 2 is very thin, and the applied volume of the elastic bulk material 5 is much larger than that of the stably deformable polymer layer 2, the mechanical behavior and stability of the complete electrode 1 can be determined by the elastic material 5. The elastic material may have a Young's modulus in the range 0 to 500 MPa, such as a Young's modulus in the range of 0 to 100 MPa, or a Young's modulus in the range of 0 to 25 MPa. The elastic material may have an elastic hysteresis in the range of 0-40%, such as a range smaller than 20%. Further, the complete electrode 1 may also behave in an elastic manner, e.g., return perfectly (without any plastic deformation) to its initial state after applying and releasing force to the electrode 1, even repeatedly. This may provide that the electrode 1 has a high mechanical stability with minimal drift/creep over time. Moreover, the softness of this elastic material can be chosen freely (e.g., from the class of soft gel materials), so that high deformation under low force and thus high sensitivity can be obtained. For instance, the elastic material may have a shore OO hardness in the range of 0-90, such as in the range of 20-40.

Figure 2:
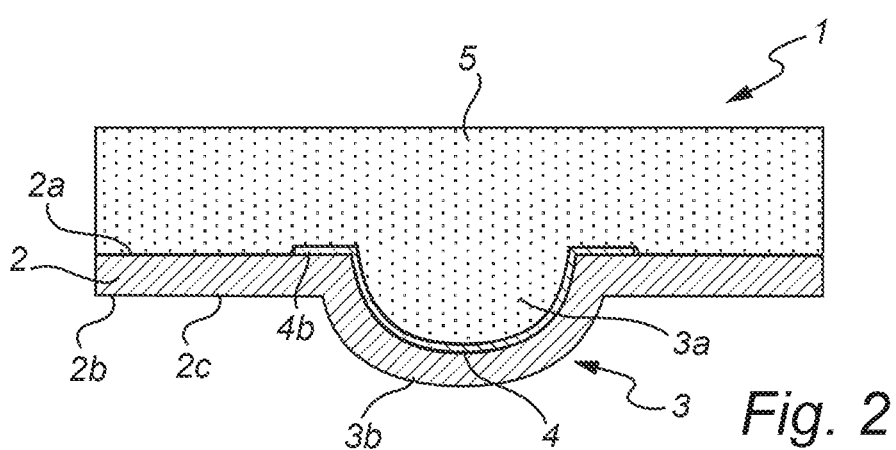
FIG. 2 is a schematic illustration of a cross-section of an embodiment of a compressible electrode with an embedded conductor layer.

FIG. 2 is a schematic illustration of a cross-section of an embodiment of a compressible electrode 1 with an embedded conductor layer. This electrode has the same arrangement as the electrode discussed in relation to FIG. 1 above, but with the difference that the stretchable conductor layer 4 is arranged on the first outer surface 2a of the stably deformable polymer layer 2. The elastic material 5 is thus at the position of the deformed portion at least partly deposited over the stretchable conductor layer 4.

However, the stretchable conductor layer 4 may also be arranged within the stably deformable polymer layer 2 at the position of the deformed portion (not illustrated in FIG. 1 or FIG. 2).

Figure 3:
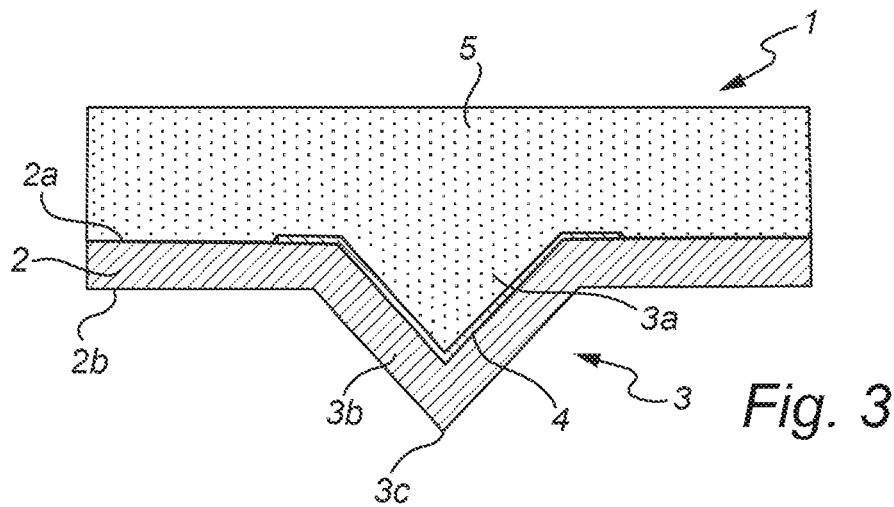
FIG. 3 is a schematic illustration of a cross-section of an embodiment of a compressible electrode having a point-shaped deformed portion.

The deformed portions 3, or at least the protrusions 3b, may have a rounded form, as illustrated in FIG. 1 and FIG. 2. As an example, the protrusions 3b may have the form of a hemisphere. As a further example, the protrusions may have a rounded form as seen in at least one cross-section of the protrusion. The protrusions 3b, and the whole deformed portions 3, may as an alternative have a tip-shaped form, as illustrated in FIG. 3. In this example, the compressible electrode 1 is as discussed in relation to FIG. 2 above, but at least one deformed portion 3 is tip-shaped, i.e. the protrusion extends from the second surface 2b of the stably deformable polymer layer 2 and converges to form a tip 3c at the distance furthest away from the surface. The deformed portion 3 may however be tip-shaped in only one cross-section. The use of a rounded or tip-shaped deformed portion may depend on the application of the electrode. An electrode having a tip-shaped deformed portion may be more sensitive to small compression forces compared to an electrode having a rounded deformed portion. In some examples, the compressible electrode comprises both rounded and tip-shaped deformed portions.

Figure 4:
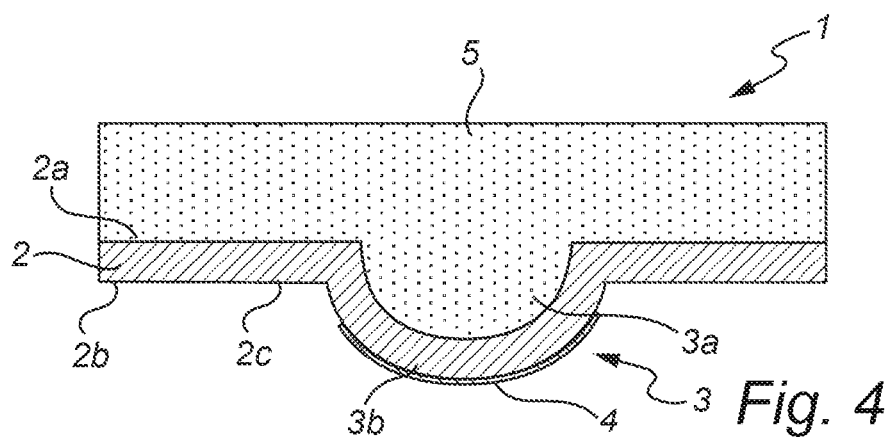
FIG. 4 is a schematic illustration of a cross-section of another embodiment of a compressible electrode with an exposed conductor layer.
Figure 5:
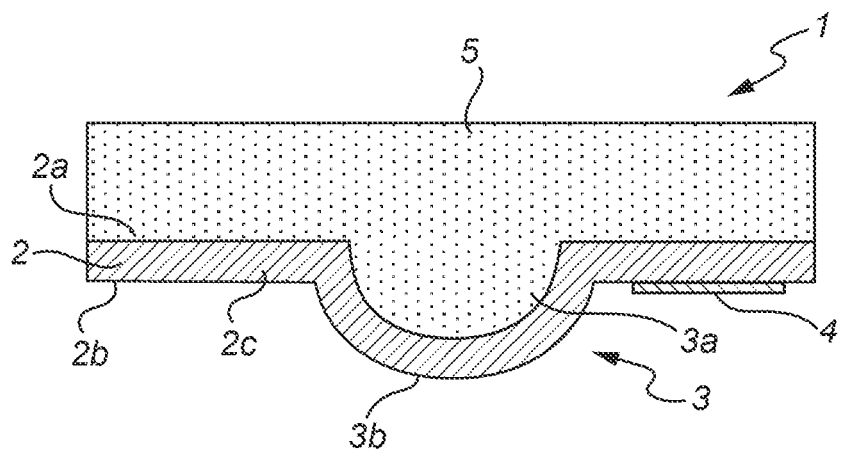
FIG. 5 is a schematic illustration of a cross-section of yet another embodiment of a compressible electrode with an exposed conductor layer.

FIG. 4 and FIG. 5 are schematic illustrations of a cross-section of an embodiment of a compressible electrode 1 with an exposed conductor layer, wherein the stretchable conductor layer 4 is differently arranged in relation to the deformed portion 3. In the embodiment shown in FIG. 1, the stretchable conductor layer 4 is arranged at the deformed portion 3 such that it further extends with edge portions 4b on a flat portion 2c of the second outer surface 2b. However, as illustrated in FIG. 4 and FIG. 5, the stretchable conductor layer 4 may alternatively extend only at the deformed portion 3 or at the non-deformed portion 2c. The compressible electrode 1 may comprise plural strips of conductor material, wherein one or more strips extend only at the deformed portion 3 and/or one or more strips extend only at the non-deformed portion 2c.

Figure 6A:
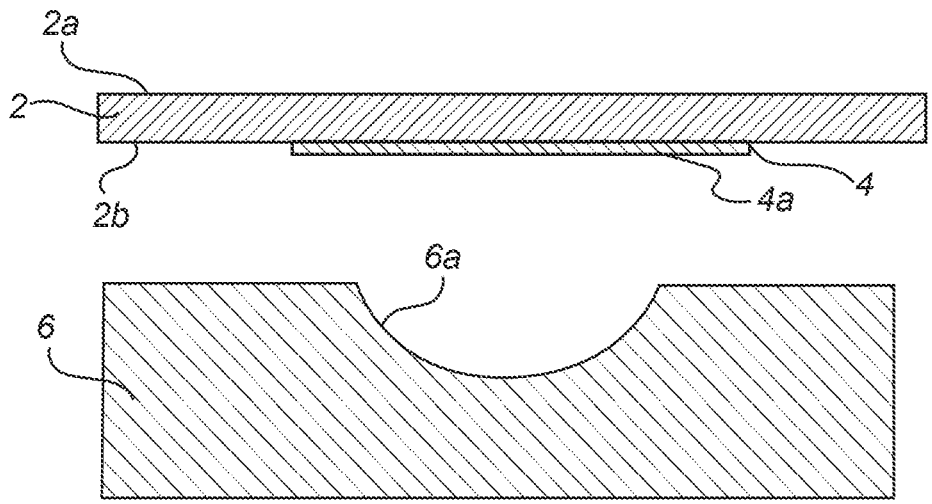
FIG. 6a, FIG. 6b, FIG. 6c, and FIG. 6d show a schematic illustration of a method of forming the compressible electrode.
Figure 6B:
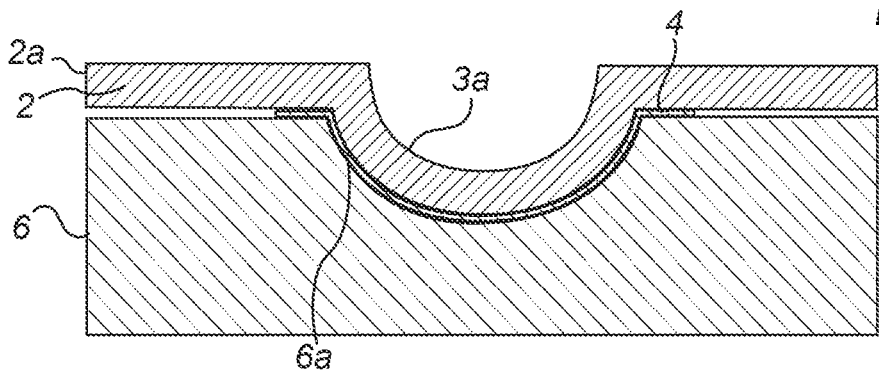

FIG. 6a to FIG. 6d illustrate a method of forming the compressible electrode discussed in relation to FIG. 1 above, i.e., a compressible electrode having an exposed conductor layer 4. In FIG. 6a, the stretchable conductor layer 4 is arranged on the second surface 2b of the stably deformable polymer layer 2 by printing a pattern, such as parallel strips 4a having a width of 5-15 mm and a pitch of 10 mm of stretchable conductors on a thin, flat stably deformable polymer substrate 2 of thermoplastic poly-urethane. Further, a metal forming tool 6 having a shape with indentation 6a equal to the shape of the desired protrusion 3b of the deformed portion of the compressible electrode 1 is provided and, as illustrated in FIG. 6b, a thermoforming process is performed for permanently deforming the thermoplastic polymer 2 and the stretchable conductor layer 4 at the position of the indentation 6a of the forming tool 6. Thus, the thermoforming process is performed by heating the stably deformable polymer layer 2 and the stretchable conductor layer 4 and forming the deformed portion 3 using a forming tool 6 having an indentation 6a corresponding to the shape of the deformed portion 3.

Figure 6C:
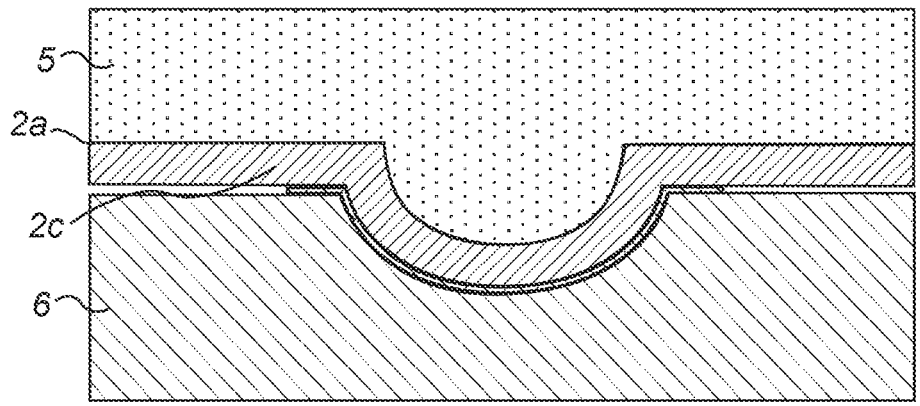
Figure 6D:
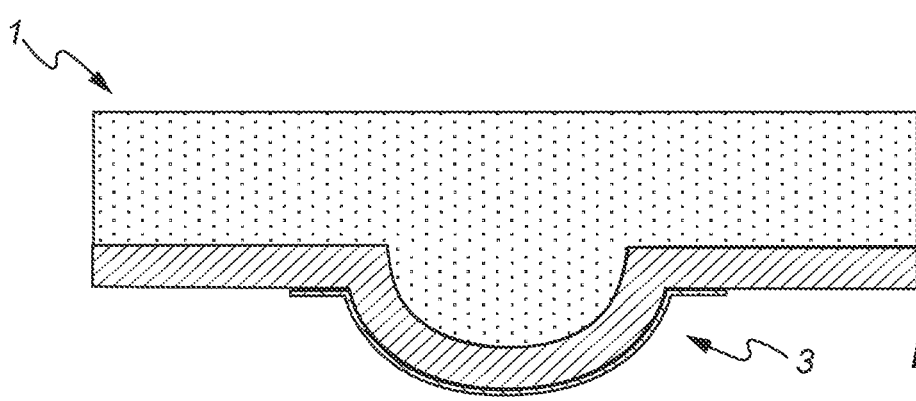

As illustrated in FIG. 6c, the thermoformed structure, i.e., in this case the formed indentation 3a in the first outer surface 2a of the stably deformable polymer layer 2, is filled with an elastic material 5 such as a polyurethane gel. In at least some embodiments, the flat portions 2c of the first outer surface 2a of the stably deformable polymer layer 2 are also covered with the elastic material 5, before the compressible electrode is released from the forming tool 6, as illustrated in FIG. 6d.

The thermoformed stably deformable polymer layer 2 and the stretchable conductor layer 4 may thus remain in the forming tool 6 when depositing the elastic material 5. As an alternative, these may be removed from the forming tool 6 and be transferred to any other support structure or carrier before deposition of the elastic material.

In order to form a compressible electrode 1 as illustrated in FIG. 2, i.e. with the stretchable conductor layer arranged in between the stably deformable polymer layer 2 and the elastic material 5, the stably deformable polymer layer 2 and the stretchable polymer 4 may be turned upside down as compared to FIG. 6a, i.e. such that the thermoplastic polymer layer 2 faces the indentation 6a of the forming tool 6.

Figure 9:
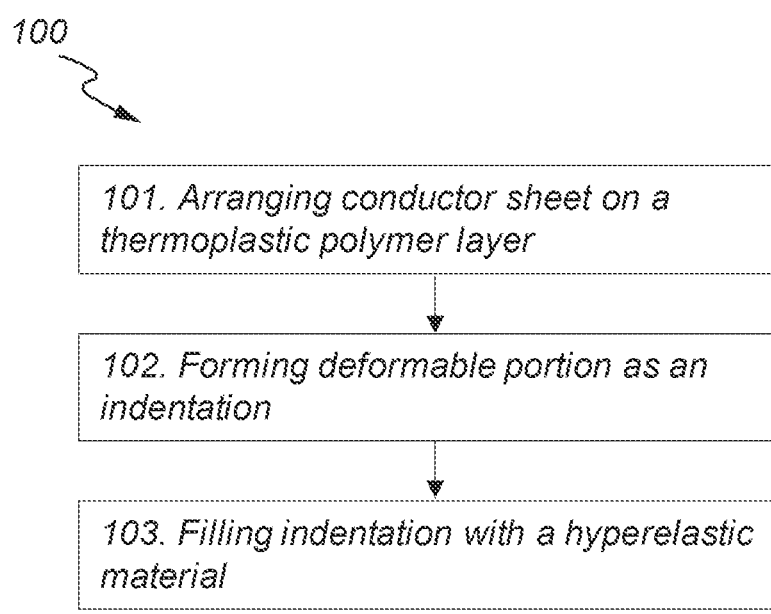
FIG. 9 schematically illustrates the steps of forming a compressible electrode.

As also illustrated in the block-diagram in FIG. 9, the method 100 thus comprises the steps of arranging 101 at least one stretchable conductor layer 4 on a first outer surface 2a or second outer surface 2b of a stably deformable polymer layer 2; forming 102 at least one deformed portion 3 as an indentation 3a in the first outer surface 2a and a corresponding protrusion 3b in the second outer surface 2b of the stably deformable polymer layer 2 at the position of the at least one stretchable conductor layer 4 thereby stably deforming the stably deformable polymer layer 2 and the at least one stretchable conductor layer 4; and filling 103 the indentation 3a with an elastic material 5.

Figure 7A:
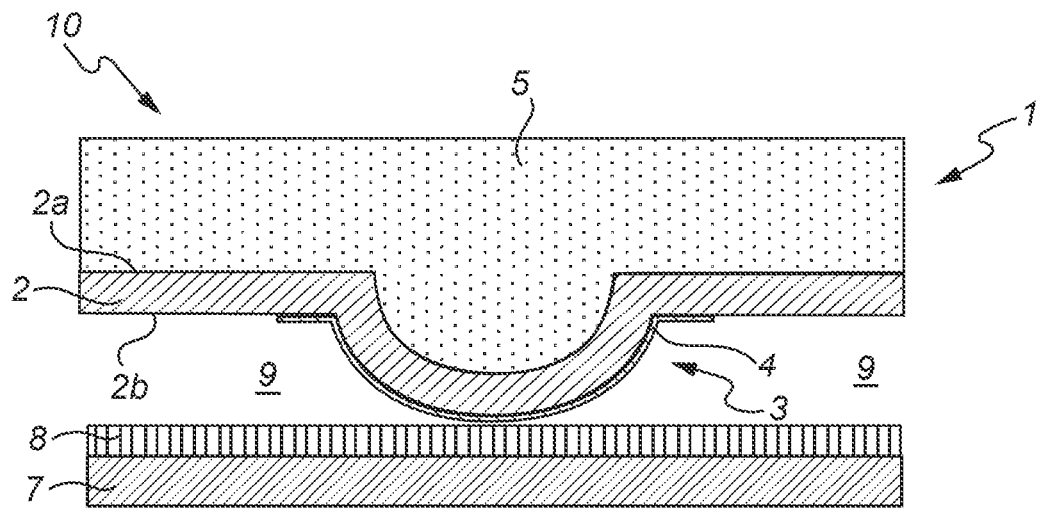
FIG. 7a and FIG. 7b illustrate an embodiment of a capacitive pressure sensor.
Figure 7B:
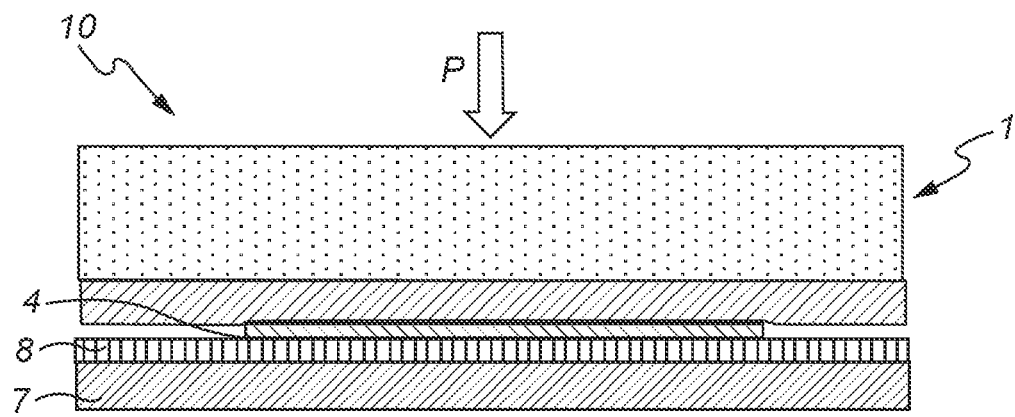

FIG. 7a and FIG. 7b illustrate an embodiment of a capacitive pressure sensor 10 in which the compressible electrode 1 illustrated in FIG. 1 is arranged. The pressure sensor further comprises an additional electrode 7, in this case illustrated as a lower flat electrode. The additional electrode 7 may for example be a flat rigid or a flexible conductor. In between the compressible electrode 1 and the additional electrode 7, there is a dielectric medium 9 in the form of air. The second surface 2b of the stably deformable polymer layer 2 of the compressible electrode 1 is arranged such that it faces the additional electrode 7. Since the stretchable conductor layer 4 is arranged on this second outer surface 2b, there is an additional dielectric layer 8 arranged on top of the additional electrode 7 such that the dielectric of the capacitive pressure sensor comprises both the air 9 and the additional dielectric layer 8. The additional dielectric layer is thus used so as to avoid a short circuit between the two electrodes of the pressure sensor. The additional dielectric layer 8 may be applied using e.g., spin coating or lamination. The additional dielectric layer 8 can be an ultrathin layer, such as between 1 and 10 μm, such as between 1 and 5 μm thick. This will result in a capacitive pressure sensor 10 with high capacitance values per unit area.

In this embodiment, the deformed portion abuts the additional dielectric 8 arranged on the additional electrode 7. The actual capacitor dielectric between the two electrodes 1, 7 of the pressure sensor 10 (the capacitor plates) thus consists of air 9 and the applied additional dielectric layer 8. When a compression force is applied onto the pressure sensor 10, the deformed portion 3 may be deformed, such as squeezed together to a form of lesser height. Therefore, the amount of air between the electrodes 1, 7 decreases due to the deformation or compression of the compressible electrode 1, i.e., the distance between the capacitor plates (equals the two electrodes 1, 7) decreases and the capacitance value will increase. A measured capacitance of the capacitive pressure sensor 10 may thus be used as a measure of the pressure force.

When all air is pressed out of the space between the two electrodes 1, 7, the capacitor dielectric is reduced to its minimal thickness over the entire surface of the capacitor. This minimal thickness is equal to the thickness of the additional dielectric layer 8. FIG. 5b is a representation of a fully compressed compressible electrode 1, i.e., in which the deformed portion 3 has been fully compressed, by the pressure force P applied substantially in parallel to the normal of the stably deformable polymer layer 2 of the pressure sensor 1 and the flat additional electrode 7.

Figure 8A:
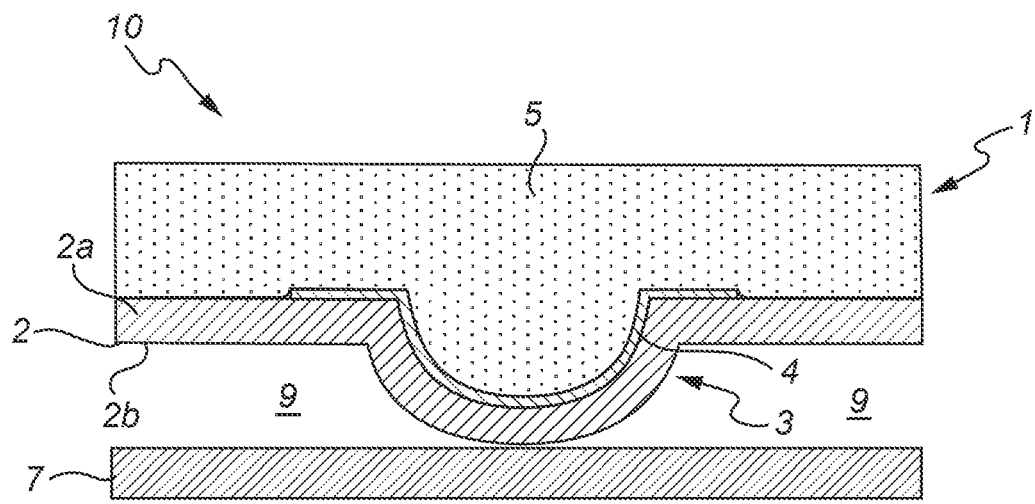
FIG. 8a and FIG. 8b illustrate an embodiment of a capacitive pressure sensor.
Figure 8B:
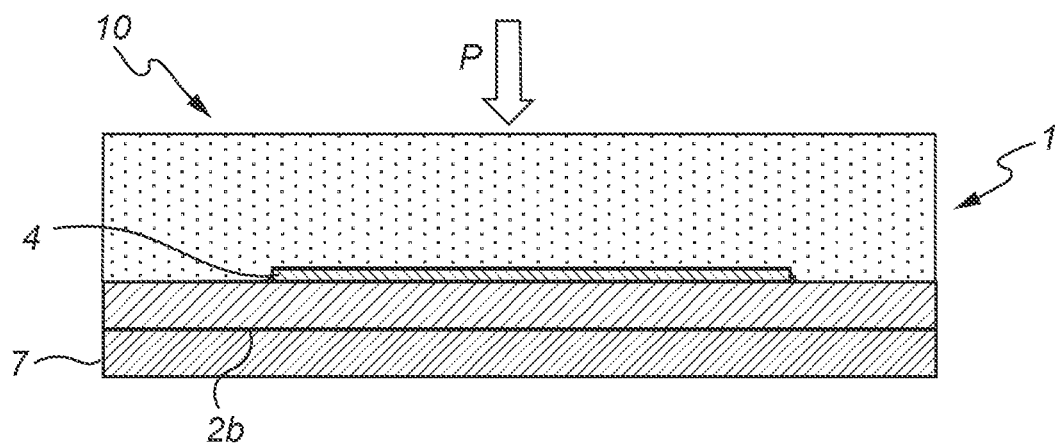

FIG. 8a and FIG. 8b illustrate an embodiment of a capacitive pressure sensor 10 in which the compressible electrode 1 illustrated in FIG. 2 is arranged. This sensor 10 functions as is discussed in relation to FIG. 7a and FIG. 7b above, but a compressible electrode 1 having the stretchable conductor layer 4 arranged on the first outer surface 2a is arranged. Thus, the stretchable conductor layer 4 is arranged between the stably deformable polymer layer 2 and the elastic material 5. Therefore, as the deformed portion 3 is arranged so that it abuts the additional electrode 7, no additional dielectric material is needed. The total dielectric medium arranged between the compressible electrode 1 and the additional electrode 7 is thus the air 9. As the pressure sensor 10 is fully compressed, as illustrated in FIG. 8b, the second surface 2b of the thermoplastic polymer layer is pressed against the additional electrode 8. The force is represented by arrow "P" and is in this case directed in the direction of the normal to the stably deformable polymer layer 2.

Figure 10A:
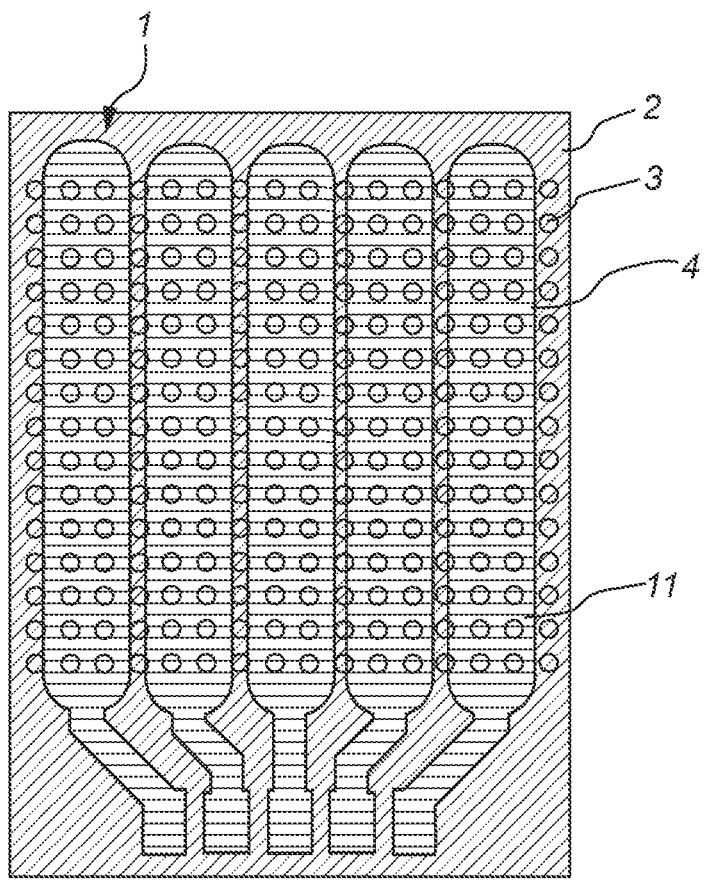
FIG. 10a is a schematic illustration of a first part of an array of capacitive pressure sensors.

Referring now to FIG. 10a to FIG. 10e, an array of capacitive pressure sensors 10 according to an embodiment will be described. FIG. 10a illustrates a bottom view of a part defining a plurality of compressible electrodes 1. As illustrated in FIG. 10a, a plurality of first strips 11 are provided, wherein the first strips 11 are defined by paths of the stretchable conductor layer 4. As shown in FIG. 10a, the paths of the first strips are parallel at least within a sensing area of the array of capacitive pressure sensors.

The stably deformable polymer layer 2 extends over an entire area of the array of capacitive pressure sensors 10, wherein deformed portions 3 are formed as indentations in a regular pattern within the stably deformable polymer layer 2. Although not shown in FIG. 10a, the elastic material 5 is arranged on the outer surface 2a of the stably deformable polymer layer 2 at least such that the elastic material 5 fills at least one indentation 3a. The elastic material may extend over an entire area of the array of capacitive pressure sensors 10.

Figure 10B:
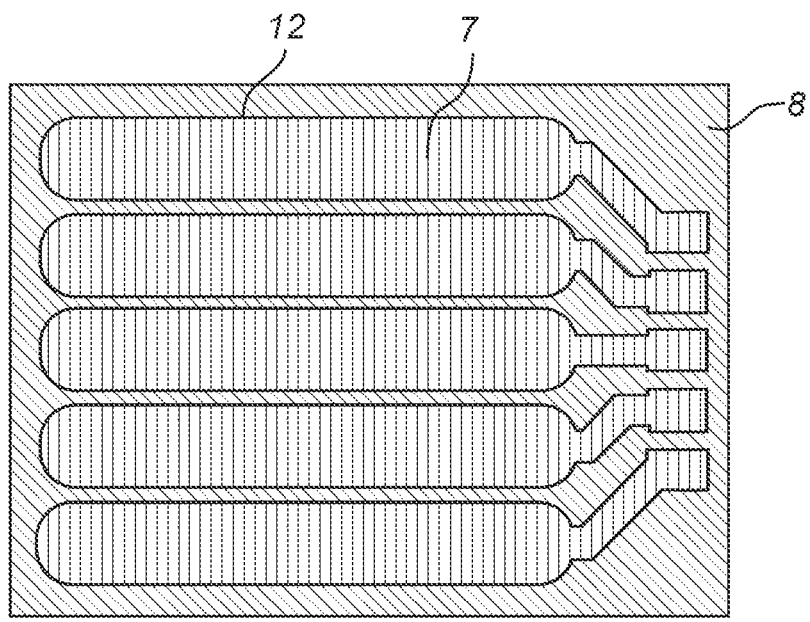
FIG. 10b is a schematic illustration of a second part of an array of capacitive pressure sensors.

FIG. 10b illustrates a bottom view of a part defining a plurality of additional electrodes 7. As illustrated in FIG. 10b, a plurality of second strips 12 are provided, wherein the second strips 12 are defined by paths of the additional electrodes 7. As shown in FIG. 10b, the paths of the second strips are parallel at least within a sensing area of the array of capacitive pressure sensors. Further, an additional dielectric layer 8 is provided to extend over an entire area of the array of capacitive pressure sensors 10.

Figure 10C:
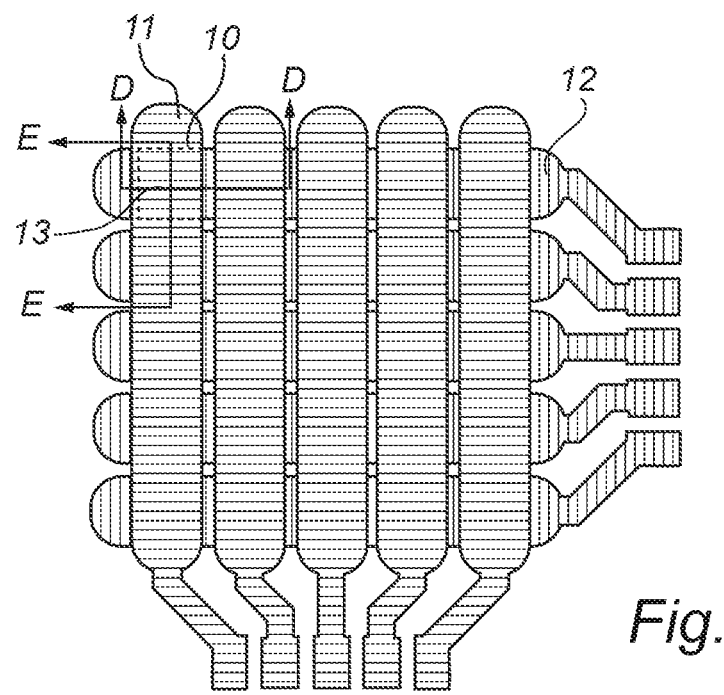
FIG. 10c is a schematic illustration of an overlap of first and second strips of an array of capacitive pressure sensors.

FIG. 10c is a schematic view illustrating an arrangement of the first strips 11 on top of second strips 12 to illustrate the relation between the first strips 11 and the second strips 12. As shown, the first strips 11 extend in a first direction and the second strips 12 extend in a second direction and in the embodiment shown in FIG. 10c, the first and second directions are perpendicular. The first and second strips 11, 12 overlap in a plurality of positions forming crossings 13 of the first and second strips 11, 12. Each crossing 13 defines one of the plurality of capacitive pressure sensors 10 in the array.

Figure 10D:
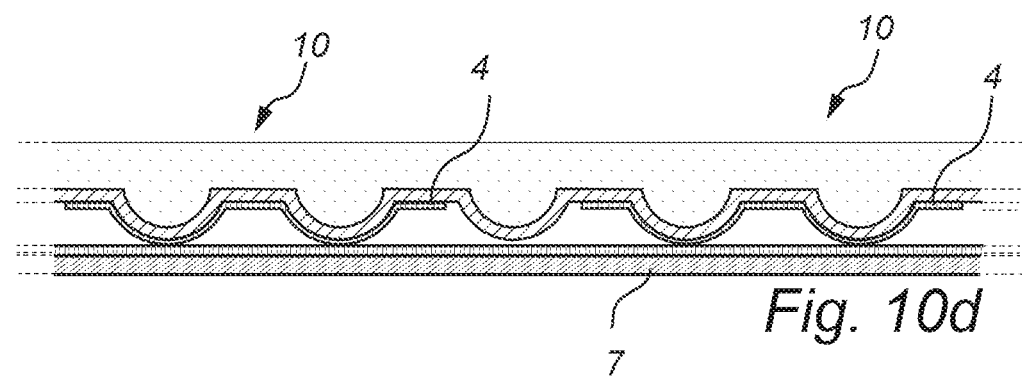
FIG. 10d is a schematic illustration of a first cross-section of an array of capacitive pressure sensors.
Figure 10E:
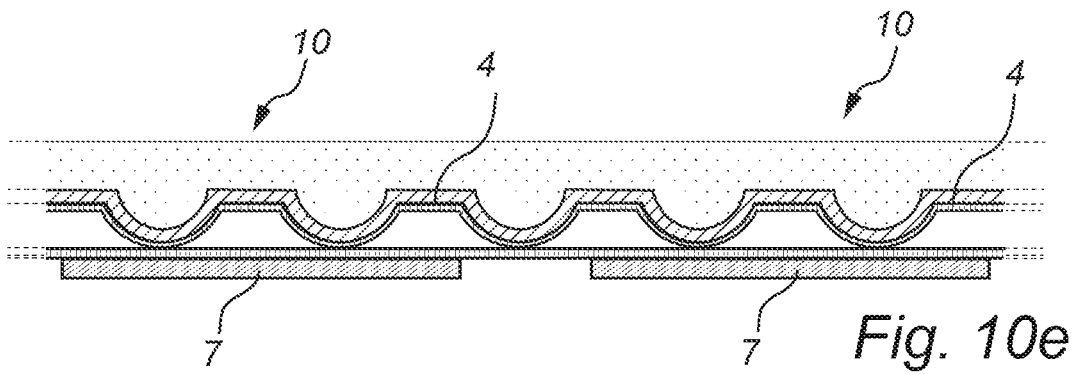
FIG. 10e is a schematic illustration of a second cross-section of an array of capacitive pressure sensors.

FIG. 10d and FIG. 10e illustrate cross-sections through the array of capacitive pressure sensors 10, as indicated by lines D-D and E-E, respectively, in FIG. 10c. As shown in FIG. 10d, along an extension of one of the additional electrodes 7, there are separate portions of the at least one stretchable conductor layer 4 (and hence separate portions of the compressible electrode 1) overlapping with the additional electrode 7. Thus, in FIG. 10d, two different crossings 13 of first and second strips 11, 12 are shown corresponding to two different capacitive pressure sensors 10. As shown in FIG. 10e, along an extension of one of the compressible electrodes 1, there are separate portions of the additional electrode 7 overlapping with the compressible electrode 1. Thus, in FIG. 10e, two different crossings 13 of first and second strips 11, 12 are shown corresponding to two different capacitive pressure sensors 10.

Figure 11:
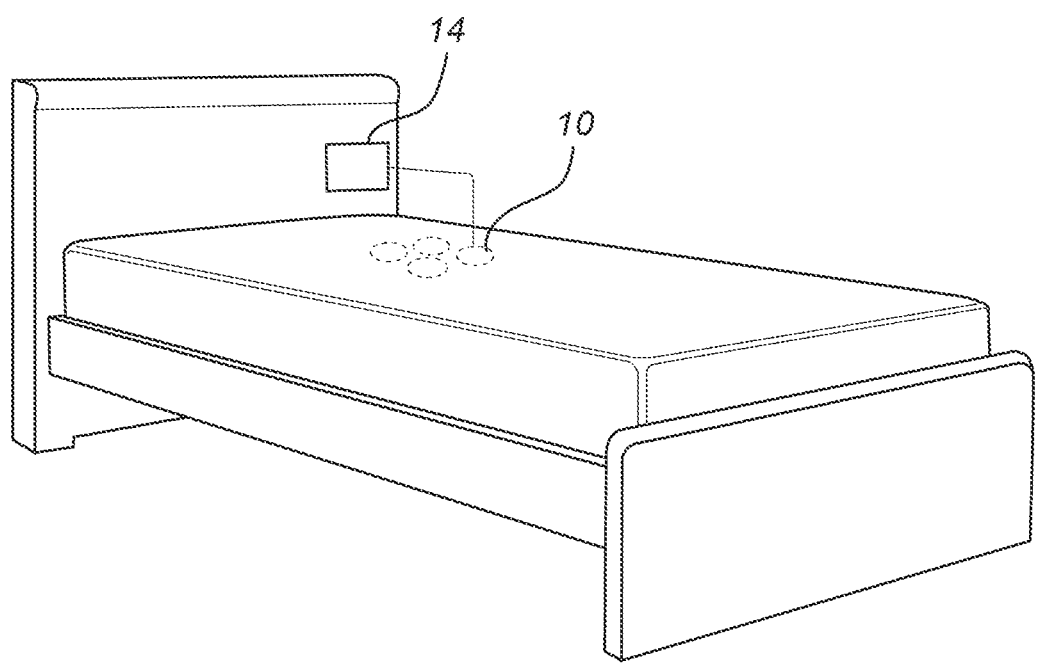
FIG. 11 is a schematic illustration of a sleep arrangement incorporating an array of capacitive pressure sensors.

One capacitive pressure sensor or a plurality of capacitive pressure sensors 10 may be integrated into a sit or sleep arrangement or an accessory associated therewith. This facilitates providing accurate pressure sensing to an intelligent sit or sleep arrangement. As illustrated in FIG. 11, an array of capacitive pressure sensors 10 may be integrated into a sleep arrangement in the form of being integrated into a mattress.

With an intelligent sit or sleep arrangement incorporating the array of capacitive pressure sensors 10, the sit or sleep arrangement may give information linked to the user and to sustainability of the sit or sleep arrangement.

Thanks to integrating the array of capacitive pressure sensors 10 into the sit or sleep arrangement, the sit or sleep arrangement can give more information to the consumer on durability of the sit or sleep arrangement or whether key properties of the arrangement are still fulfilling the user's needs. The array of capacitive pressure sensors 10 may further be combined in the sit or sleep arrangement with other sensors that may measure properties that do not have an impact on the comfort properties of the sit or sleep arrangement. This implies that more data input may be provided to the sit or sleep arrangement, such as by temperature and/or humidity sensors, accelerometers or gyrometers, odor or other emission detectors.

Combined with a software program and algorithms, these sensors can generate interesting data that can be used both as personal feedback to the user or his environment as a logging tool with possible outputs such as presence detection (elderly), sleep or sit positioning detection (body placement or sleep/sitting posture), movement detection which could be linked with being awake or being in light sleep, overall pressure points and body support, climate properties to advice change of bed sheets or turning the mattress (summer-winter side), or even general sleep tracking. Also general feedback about the sit or sleep arrangement can be exchanged with product suppliers as a service to track overall product performance (e.g. hardness loss, durability performance, current product firmness) to get information whether or not the product maintains its effectiveness and if certain parts need to be replaced.

The array of capacitive pressure sensors 10 can be integrated into consumer products with a minimal impact on comfort (making sure that the array of capacitive pressure sensors are not noticeable during daily use) such as in (separate) toppers, (separate) covers (fabric), mattresses (between or on certain layers), bed bases, pillows, vehicle seats, office chairs, or in other seating solutions.

Besides the use of capacitive pressure sensors 10 in an application being integrated in a sit or sleep arrangement, the capacitive pressure sensors 10 can alternatively be used as a stand-alone sensor device to evaluate sit or sleep arrangements for other product analysis in-shop (at retailers), for marketing reasons such as product presentation, or in a research and development environment to develop or improve the effectiveness of certain products or materials.

As further shown in FIG. 11, the measurements performed by the array of capacitive pressure sensors 10 may be used for controlling an output device 14. The measurement results from the array of capacitive pressure sensors 10 may be provided directly to the output device 14 or may provided to a controlling unit, which may analyze the measurement results, possibly together with results from other sensors and provide control signals for controlling the output device 14.

The output device 14 provides an active output in a sit or sleep arrangement. The output device 14 may thus be used for changing properties of the sit or sleep arrangement in dependence of the input from the array of capacitive pressure sensors 10, such as to adapt to a change of posture of the person.

By using the integration of capacitive pressure sensors 10 and connecting them with a smart active system, the sit or sleep comfort of an end user can be actively improved without the (intensive) need of manual input. The active system can auto-adapt certain (comfort) properties such as hardness level, zoning, climate properties, etc., depending on the detected output of the used sensors and the need of the end user.

In the above, the disclosure describes a number of examples. However, as is readily appreciated by a person skilled in the art, other examples than the ones disclosed above are equally possible within the scope of the disclosures, as defined by the appended claims.

The invention claimed is:

1. A compressible electrode comprising:
a stably deformable polymer layer comprising a first outer surface, a second outer surface, at least one deformed portion formed as at least one indentation in the first outer surface and at least one corresponding protrusion in the second outer surface, and at least one non-deformed portion,
at least one stretchable conductor layer arranged on or within the stably deformable polymer layer at the at least one deformed portion and/or at the at least one non-deformed portion, wherein the stably deformable polymer layer is stably deformed at the at least one deformed portion; and
an elastic material arranged on the first outer surface such that the elastic material fills the at least one indentation of the at least one deformed portion.

2. The compressible electrode of claim 1,
wherein the at least one stretchable conductor layer is arranged at least at the at least one deformed portion, and
wherein the at least one stretchable conductor layer is stably deformed at the at least one deformed portion.

3. The compressible electrode of claim 1, wherein the at least one stretchable conductor layer is arranged on the first outer surface of the stably deformable polymer layer.

4. The compressible electrode of claim 1,
wherein the at least one stretchable conductor layer is arranged on the second outer surface of the stably deformable polymer layer.

5. The compressible electrode of claim 1,
wherein the stably deformable polymer layer comprises a plurality of deformed portions, and
wherein the at least one stretchable conductor layer is arranged on or within the stably deformable polymer layer at the plurality of deformed portions.

6. The compressible electrode of claim 1, wherein the elastic material has a volume that is larger than the volume of the stably deformable polymer layer.

7. The compressible electrode of claim 1, wherein a thickness of the stably deformable polymer layer is less than 100 µm.

8. A capacitive pressure sensor comprising:
a compressible electrode according to claim 1 arranged over an additional electrode and with the second outer surface facing the additional electrode; and
at least one dielectric medium arranged between the second outer surface and the additional electrode,
wherein the compressible electrode and the additional electrode are arranged such that compression of the at least one deformed portion of the compressible electrode changes a capacitance of the capacitive pressure sensor.

9. The capacitive pressure sensor of claim 8, wherein the at least one deformed portion of the compressible electrode abuts the additional electrode or an additional dielectric layer arranged on top of the additional electrode.

10. The capacitive pressure sensor of claim 8,
wherein the at least one stretchable conductor layer is arranged on the first outer surface of the stably deformable polymer layer of the compressible electrode, and
wherein the at least one dielectric medium is air.

11. The capacitive pressure sensor of claim 8,
wherein the at least one stretchable conductor layer is arranged on the second outer surface of the stably deformable polymer layer of the compressible electrode, and
wherein the capacitive pressure sensor comprises an additional dielectric layer arranged on top of the additional electrode, such that the at least one dielectric comprises both air and additional dielectric layer.

12. The capacitive pressure sensor of claim 8, wherein the capacitive pressure sensor is configured to be integrated into an arrangement for receiving and supporting at least a part of a body of a person.

13. An array of capacitive pressure sensors, the array comprising:
a plurality of capacitive pressure sensors according to claim 8, wherein the plurality of capacitive pressure sensors are formed by:
a plurality of separate first strips, each first strip comprising the compressible electrode of a subset of the plurality of capacitive pressure sensors and being configured to extend in a first direction, wherein each first strip comprises a plurality of deformed portions; and
a plurality of separate second strips, each second strip comprising the additional electrode of a subset of the plurality of capacitive pressure sensors and being configured to extend in a second direction, which is not parallel to the first direction;
the plurality of first strips and the plurality of second strips being arranged so as to form crossings between the first strips and the second strips, wherein the first and the second strips overlap, and
wherein each crossing defines one of the plurality of capacitive pressure sensors in the array.

14. A sit or sleep arrangement, comprising:
at least one capacitive pressure sensor according to claim 8, and
an output device configured to be controlled based at least on an input from the at least one capacitive pressure sensor for controlling at least one property of the sit or sleep arrangement in a group of properties comprising a hardness of one or more zones of the sit or sleep arrangement, a shape of the sit or sleep arrangement, a temperature of the sit or sleep arrangement, and air circulation of the sit or sleep arrangement.

15. A sit or sleep arrangement, comprising:
at least one capacitive pressure sensor according to claim 8, and
an output device configured to be controlled based at least on an input from the at least one capacitive pressure sensor for controlling at least one property of the sit or sleep arrangement in a group of properties comprising a hardness of one or more zones of the sit or sleep arrangement, a shape of the sit or sleep arrangement, a temperature of the sit or sleep arrangement, and air circulation of the sit or sleep arrangement, wherein:
(1) the at least one deformed portion of the compressible electrode abuts the additional electrode or an additional dielectric layer arranged on top of the additional electrode,
(2) the at least one stretchable conductor layer is arranged on the first outer surface of the stably deformable polymer layer of the compressible electrode, and the at least one dielectric medium is air,
(3) the at least one stretchable conductor layer is arranged on the second outer surface of the stably deformable polymer layer of the compressible electrode, and the at least one capacitive sensor comprises an additional dielectric layer arranged on top of the additional electrode, such that the at least one dielectric comprises both air and additional dielectric layer, or (4) the at least one capacitive pressure sensor is configured to be integrated into an arrangement for receiving and supporting at least a part of a body of a person.

16. The compressible electrode of claim 1, wherein:

the at least one stretchable conductor layer is arranged on the second outer surface of the stably deformable polymer layer, the stably deformable polymer layer comprises a plurality of deformed portions, and the at least one stretchable conductor layer is arranged on or within the stably deformable polymer layer at the plurality of deformed portions.

17. A method of forming a compressible electrode, the method comprising:

arranging at least one stretchable conductor layer on a first or second outer surface of a stably deformable polymer layer or within the stably deformable polymer layer;

forming at least one deformed portion as at least one indentation in the first outer surface and at least one corresponding protrusion in the second outer surface of the stably deformable polymer layer, thereby stably deforming the stably deformable polymer layer; and filling the at least one indentation with an elastic material.

18. The method of claim 17, wherein forming at least one deformed portion comprises subjecting the stably deformable polymer layer to a thermoforming process.

19. The method of claim 18, wherein the thermoforming process is performed by heating the stably deformable polymer layer, thereby forming the at least one deformed portion using a forming tool having at least one indentation corresponding to a shape of the at least one deformed portion.

20. The method of claim 17, wherein the elastic material is further formed at non-deformed portions of the first or second outer surface of the stably deformable polymer layer.

* * * * *